Oct. 6, 1959

W. P. MASON 2,907,811

APPARATUS FOR ELIMINATING MECHANICAL
VIBRATIONS IN AERIAL CABLES

Filed Feb. 26, 1954

INVENTOR
W. P. MASON
BY
H. O. Wright
ATTORNEY

Oct. 6, 1959

W. P. MASON 2,907,811

APPARATUS FOR ELIMINATING MECHANICAL VIBRATIONS IN AERIAL CABLES

Filed Feb. 26, 1954

INVENTOR
W. P. MASON
BY
H. O. Wright
ATTORNEY

INVENTOR
W. P. MASON
BY
H. O. Wright
ATTORNEY

_United States Patent Office_

2,907,811
Patented Oct. 6, 1959

2,907,811

APPARATUS FOR ELIMINATING MECHANICAL VIBRATIONS IN AERIAL CABLES

Warren P. Mason, West Orange, N.J., assignor to Bell Telephone Laboratories, Incorporated, New York, N.Y., a corporation of New York Application February 26, 1954, Serial No. 412,770

2 Claims. (Cl. 174—42)

This invention relates to apparatus for eliminating harmful effects of mechanical vibration in the spans of an aerial cable system. More particularly, it relates to apparatus for freely transmitting the vertical mechanical vibrations arriving at the end of a cable span, either to an absorbing or dissipative mechanical terminating member or to adjacent spans of the aerial cable system. The establishing of vertical standing waves of substantial amplitude on any span is, thereby, effectively inhibited.

Low frequency vertical vibrations are established in the spans of an aerial cable system by unbalanced air pressures generated by winds of even very moderate velocity. If the end of the span is rigidly supported, in accordance with the substantially universal practice of the prior art, or if the mechanical impedance of the support for the vibrational frequencies involved is substantially different from that of the cable span, the vibrations are reflected back into the span from the support and a substantial vertical standing wave is established on the span which tends to increase in amplitude under the continuing influence of the wind. The phenomena is known to those skilled in the art as "dancing" of the cable. Very substantial amplitudes may be established and rupture of vital portions of the cable, particularly at or near the support, by fatigue phenomena are not infrequent.

In accordance with the present invention, if the prior art types of supports at each end of each span are eliminated by substituting supporting means which are also mechanical band-pass wave filters having a mechanical impedance substantially matching that of the spans of cable and capable of freely transmitting the vibrational energy from each span into the next successive adjacent span, at either end of a span the vibrational energy of all the spans will be distributed in a random manner throughout a plurality of spans. Interference phenomena will then substantially reduce the amplitude of the vibrations in each span and effectively inhibit the establishing of large standing waves. Also, because of the mechanical impedance match and the free transmission of the vibrational energy through the points of support from span to span, fatigue and rupture of portions of the cable at and near the points of support are effectively eliminated.

Alternatively, any of the mechanical wave filter supporting means of the invention may have one end connected to a mechanical energy absorbing device, or "termination" as it is called in electrical circuits, such as a "dash-pot," "prony-brake," or the like, the mechanical impedance of which substantially matches that of the filter. The end of the cable span is then connected to the other end of the mechanical filter and the vibratory energy of the cable span will be freely transmitted through the filter to the energy absorbing device and be absorbed thereby, substantially no energy being reflected back into the cable span. This alternative arrangement is, of course, particularly appropriate for use at the end of the last span of an aerial cable system where there is no adjacent span to which vibrational energy may be transmitted. It may also be desirable to employ such an arrangement where successive spans are of substantially different lengths or mechanical characteristics or where smaller branching cables are connected to a large "trunk" cable system, etc.

Investigation of the vibrational phenomena involved has revealed that, to be effective, the mechanical bandpass filter employed to support and interconnect the successive spans mechanically (or to terminate any span mechanically) must not only have a sufficiently wide pass-band that it will pass a number of the lower harmonics of the fundamental vibrational frequency of the cable span but it must also substantially match the mechanical impedance of the cable span at these vibrational frequencies of the span. It should be particularly noted that even though the filter did nominally transmit a very wide frequency band it might nevertheless reflect substantially all energy applied to its input if its characteristic mechanical impedance differs grossly from that of the cable span at the frequencies of the applied energy.

To recapitulate, the wave filter, cable supporting means must both freely transmit several low harmonics of the fundamental frequency of vibration of the cable span (usually at least the second, third and fourth harmonics of the fundamental frequency) and substantially match the characteristic mechanical impedance of the cable span at these frequencies.

The frequencies of vertical vibration of a cable span and its characteristic mechanical impedance will both vary appreciably with changes in temperature. For example, in a 300 foot span of a widely used type of cable the frequencies of vibration and its characteristic mechanical impedance may vary approximately ten percent with the temperature variations to be expected throughout the year in numerous localities in which aerial cables are employed. It is, therefore, further necessary that the mechanical filters of the invention have an even wider pass-band of frequencies within which they substantially match the mechanical impedance of the cable span and freely pass the lower harmonics of the fundamental frequency for the complete ranges of variation of vibration frequency and impedance, respectively, corresponding to the temperature variations likely to be encountered in the locality in which any particular aerial cable is installed.

The serious inadequacies of the majority of such prior art cable supporting arrangements as do employ movable mechanical supports, can usually be readily traced to either a lack of even an approximate match of the mechanical impedance of the cable span or an insufficiently wide frequency pass-band, or both, so that the stronger harmonic frequencies of vertical vibration are not freely transmitted from span to span. Obviously, a support mechanically resonant at a single frequency can be effective only at that frequency and even at that frequency its characteristic impedance may differ so greatly from that of the cable span that a substantial portion of the vertical vibratory energy is reflected back into the span in which it originated rather than being passed freely to the successive spans. Moreover, singly resonant structures cannot readily be designed to follow changes in the vibration frequency or impedance of the cable resulting from temperature changes.

As is well understood by those skilled in the art, properly designed wave filters (electrical or mechanical) can be considered as vibratory systems exhibiting, in effect, a continuous resonance throughout the entire range of frequencies which are freely transmitted through the filter. Furthermore, a properly designed wave filter (either electrical or mechanical) which freely transmits a wide band of frequencies can also provide substantially predetermined varying characteristic impedance over a major portion of the wide frequency range which it freely transmits. The mechanical band-pass wave filter supports of the invention are thus, obviously, readily adaptable to provide both free transmission and a substantially matching impedance over a broad range of frequencies, as required to obtain the objectives of the present invention.

An interesting exposition, including illustrative photographs, of the action of a specific mechanical band-pass wave filter is given, for example, in the article entitled "Filters in Action" by C. E. Lane, published September 1933 in vol. 12, No. 1, of the Bell Laboratories Record, pages 2 through 7, inclusive. While the filter described by Lane is, obviously, not adapted for the purposes of the present invention, the article illustrates pictorially the generic phenomena encountered with mechanical wave filters.

A primary object of the invention, accordingly, is the elimination of harmful effects of mechanical vibration in the spans of an aerial cable system.

Another object is to facilitate the free transmission of mechanical vibrational energy from each span of an aerial cable system to adjacent spans of the system.

Another object is to provide for the substantially complete and reflectionless absorption of vertical mechanical vibratory energy at the end of a cable span.

A further object is to provide band-pass, mechanical wave filter, cable-supporting means having suitable characteristic impedances and sufficiently wide pass-bands to freely transmit the principal harmonics of the fundamental frequency of vibrations arising in the spans of an aerial cable system throughout the entire temperature range of the locality in which the cable system is located.

A still further object is to provide simple, convenient and economical mechanical band-pass filter structures for use in supporting the spans of aerial cable systems.

Other and further objects and features of the invention will become apparent during the course of the following description of specific illustrative embodiments of the principles of the invention and from the appended claims.

A few of the numerous and varied forms which the devices of the invention may take are shown in the accompanying drawings in which.

Figure 4:
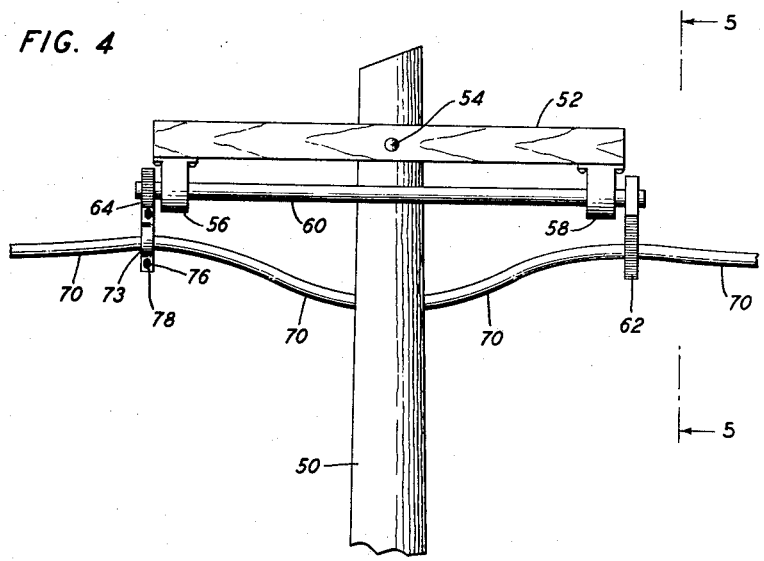
Fig. 4 illustrates a particularly simple, convenient and economical form of mechanical, band-pass, wave filter, span supporting arrangement operating in accordance with the principles of the invention.
Figure 5:
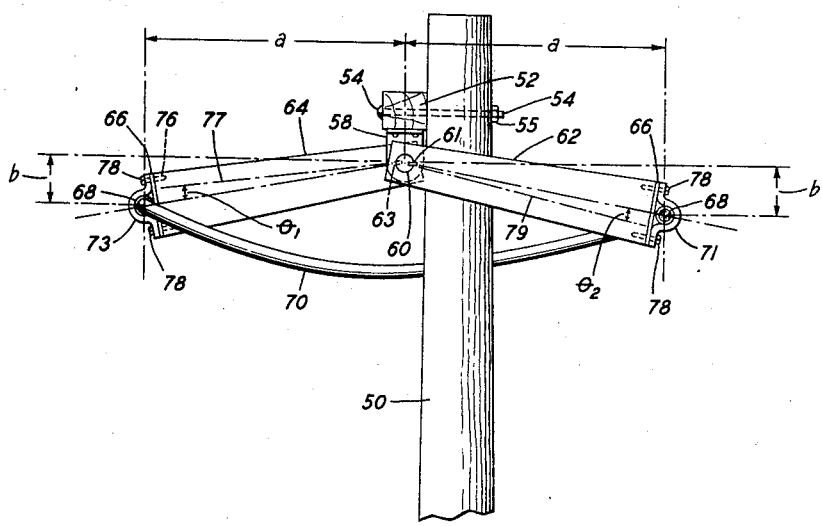
Fig. 5 is an end view of the principal elements of the filter structure illustrated in Fig. 4.
Figure 6:
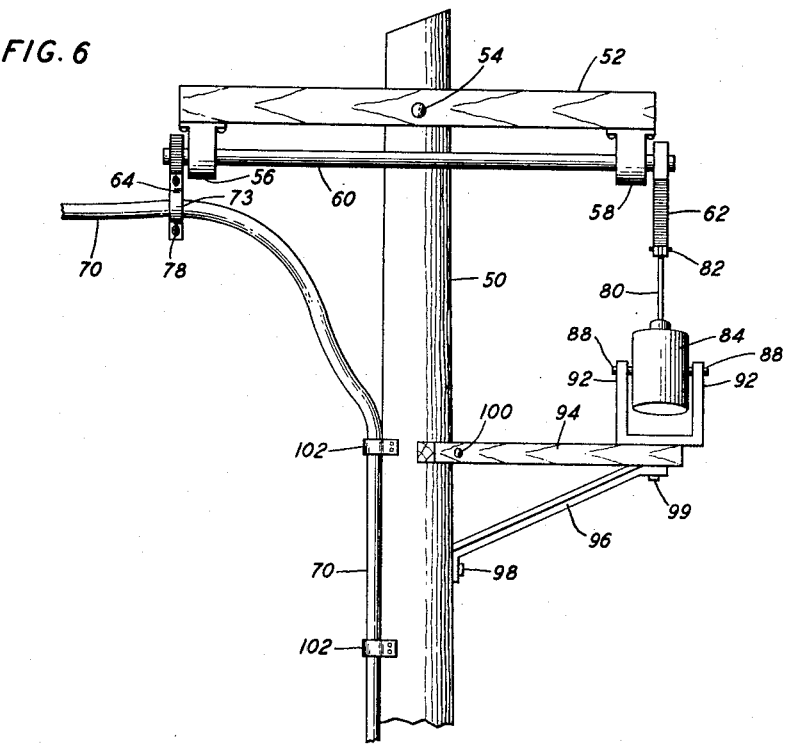
Figure 7:
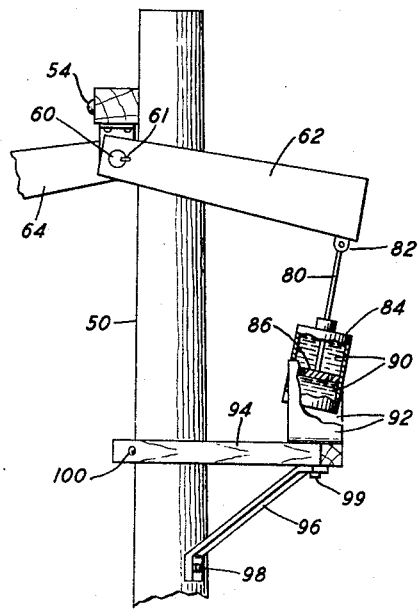
Figure 8:
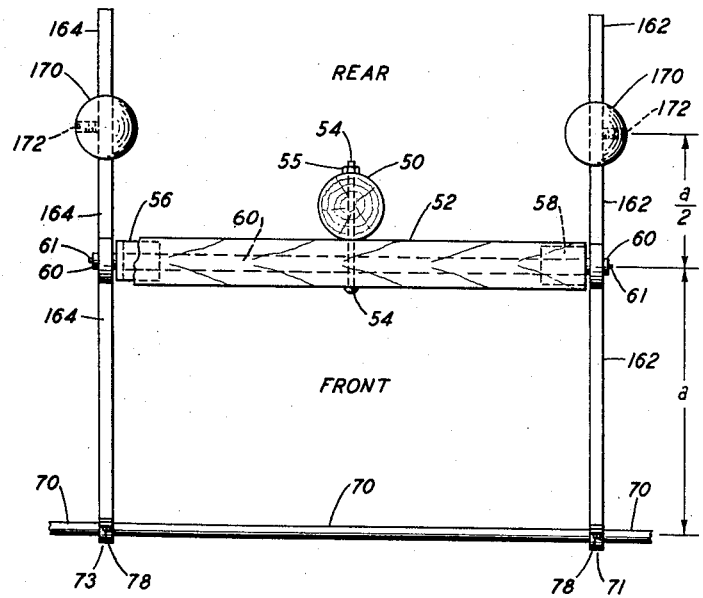
Figure 9:
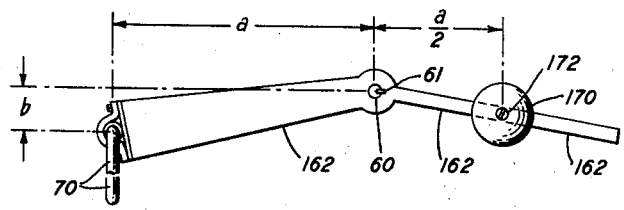

Figs. 6 and 7 illustrate the combination of a mechanical band-pass wave filter of the type illustrated by Figs. 4 and 5 with a vibratory mechanical energy absorbing means or "termination" connected to the "output" of the wave filter; and Figs. 8 and 9 illustrate a still further form of mechanical, band-pass, wave filter, cable supporting arrangement embodying the principles of the present invention.

Several other specifically different forms of mechanical filtering arrangements, embodying certain of the generic principles and suitable for use in cable supporting arrangements of the present invention, are shown in the companion application of R. N. Thurston, Serial No. 412,888, being filed February 26, 1954, concurrently with the present application, and assigned to applicant's assignee. This application matured as Patent 2,852,595 granted September 16, 1958. Numerous and varied other specific forms of mechanical wave filters suitable for use as cable supporting means in accordance with the principles of the present invention can, obviously, be readily devised by those skilled in the art. Applicant's book entitled "Electromechanical Transducers and Wave Filters," Second Edition, published by D. Van Nostrand Co., Inc., 250 Fourth Avenue, New York 3, New York, 1948, discusses and illustrates the general principles involved in the design of mechanical wave filters.

Figure 1:
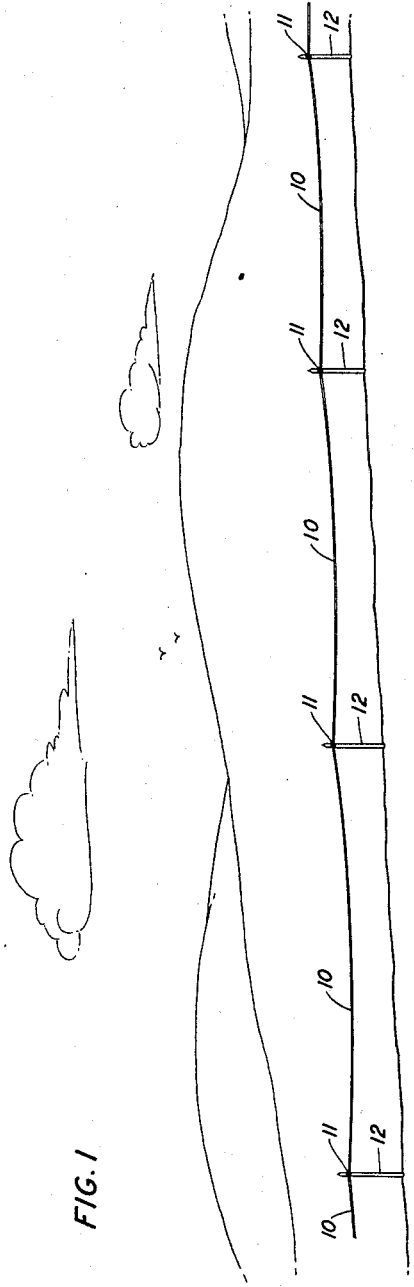
Fig. 1 illustrates a portion of a multispan aerial telephone cable system typical of those with which the mechanical band-pass wave filter supports of the invention are intended to be used.

In more detail in Fig. 1, a conventional aerial telephone cable system is illustrated and comprises a cable 10 supported at a plurality of substantially equal intervals by supporting means 11, affixed to wooden telephone poles 12. In prior art cable systems the supporting means 11 are usually substantially rigid with the result that mechanical vibration originating in a span is reflected from the support back into the span in which it originated and standing waves of substantial amplitude are quickly established. In accordance with the principles of the present invention, supporting means which do not reflect any substantial amount of the vibratory energy back into the span in which it originated are employed and the tendency to build up large amplitude standing waves on any span is thus largely eliminated. For a typical installation, the distance between poles may be in the order of 300 feet, the distance being occasionally varied as the particular terrain or other local abnormalties may require. A frequently used type of telephone cable includes a steel supporting "strand" and a plurality of insulated pairs of highly conductive wire, the latter being encased in a combined metal and plastic sheath. Usually paper or some similar material is employed to insulate the individual wires of the cable and the sheath is relied upon to exclude moisture which would destroy the effectiveness of such insulation. The "strand" may in many instances be itself composed of a plurality of smaller steel strands twisted together. The sheath is bound to or otherwise supported by the supporting steel strand at short intervals so as to relieve the sheath and electrical conductors of the cable of substantially all tensile stress. The combination of cable and supporting strand for a frequently used cable of the above mentioned type weighs approximately 0.57 pound per linear foot. This particular cable is usually hung so that for a 300 foot span, the steel "strand" is under a tension in the order of between 1500 and 2000 pounds and the center of the span has a sag of substantially 50 inches below the points of support on the poles at the ends of the span (assuming that both end supports are in substantially the same horizontal plane).

The serious consequences which may result from "dancing" or vertical vibration of the cable, as described in detail above are readily apparent since it may result in the rupture of the cable sheath or even of the steel supporting "strand." Should the strand become ruptured, the full tension must be assumed by the cable itself and rupture of both the sheath and the conductors may then result. In extreme cases of cable "dancing" even the supporting poles have been damaged by the violence of the standing waves which have been built up by the continuing action of the wind.

Treating the combined cable and "strand" as a flexible string having the tension of the strand and the mass per unit length of the combination of strand and cable, a period of slightly over 2 seconds for the fundamental mode of vertical vibration (corresponding to a cable span of substantially one half of a wavelength) is obtained. Assuming that the cable itself weighs 0.3 pound per foot and the steel supporting "strand" in additional 0.27 pound per foot, the total mass per unit length is 0.0178 slug per foot. The propagation velocity, assuming a tension on the steel strand of 1550 pounds, is 294 feet per second. The characteristic impedance $Z_c$ of the cable and strand under these conditions is 5.25 slugs per second or 5.25 pound seconds per foot.

The sag, and hence the tension, the propagation velocity, and the characteristic impedance all change appreciably with temperature as has been previously indicated. Under the conditions described above, the second, third and fourth modes (harmonics) would have frequencies of substantially 1, 1.5, and 2 cycles per second, respectively. To avoid the establishment of serious "dancing" (or vertical standing waves of serious amplitude) the cable supporting wave filter of the invention must substantially match the cable impedance and must freely transmit at least the above noted group of harmonic frequencies for all values that they may assume over the range of temperatures encountered in the locality in which the aerial cable system is installed.

In analyzing the specific illustrative forms of mechanical filters employed in the arrangements of the present invention and particularly those illustrated in Figs. 3, 4 and 8 of the accompanying drawings, reference will be made to an analogous form of band-pass electrical wave filter, shown in electrical schematic diagram form in Fig. 2 of the accompanying drawings.

This electrical filter is also shown as filter number 9 of Table I at pages 52 and 53 of applicant's above-mentioned book entitled "Electromechanical Transducers and Wave Filters," Second Edition, and its impedance and transmission characteristics are indicated. Applicant's abovementioned book and the publications cited therein may be referred to for complete detailed explanations of the theory, design and construction of both electrical and mechanical wave filter structures of numerous and varied forms and construction.

Figure 2:
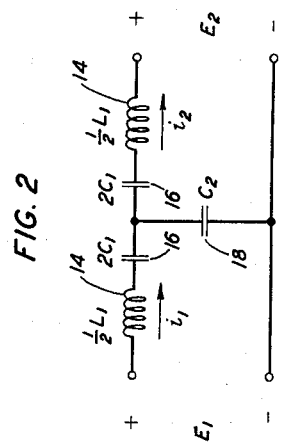
Fig. 2 is a schematic diagram of an analogous type of electrical band-pass wave filter corresponding closely to the specific illustrative mechanical band-pass wave filters illustrated in Figs. 3 and 4.

In more detail in Fig. 2, a single full section of a conventional type of electrical band-pass wave filter, terminated in "mid-series" arms at each end, is illustrated in electrical schematic diagram form. It comprises two like series arms each consisting of an inductance 14, also designated $\frac{1}{2}L_1$, and a capacitance 16, also designated as $2C_1$, and a single shunt branch or arm intermediate the two series arms, as shown, the shunt branch comprising a single capacitor 18, also designated $C_2$. As is well known to those skilled in the art, the literal designations of the elements indicate that for each of the series arms the value of inductance is one half and the value of the capacitance is double that which would be found in the series arm of a full section of the same type of filter, if terminated, for example, in "mid-shunt," or otherwise, at each end respectively. Assuming that an input voltage designated $E_1$ is applied to the left terminals of the filter section shown in Fig. 2 and results in an output voltage, designated $E_2$ (across an electrical "load" connected to the right-hand terminals of the section), a current of $i_1$ will flow in the left-hand mesh and a resulting current of $i_2$ will flow in the right-hand mesh. The mesh equations for the structure are:

$$E_1 - \frac{j\omega L_1}{2}i_1 - \frac{i_1}{2j\omega C_1} - \frac{i_1 - i_2}{j\omega C_2} = 0 \tag{1}$$

$$-E_2 + \frac{i_1 - i_2}{j\omega C_2} - \frac{i_2}{2j\omega C_1} - \frac{j\omega L_1}{2} = 0 \tag{2}$$

(In the above equations $\omega$ is the frequency expressed in radians, i.e., it is $2\pi$ times the frequency of the applied signal.)

The following filter relations hold:

$$\omega_A^2 = \frac{1}{L_1 C_1} \tag{3}$$

$\omega_A = 2\pi f_A$ where $f_A$ is the lowest frequency passed by the filter which is known as the "lower cutoff frequency."

$$\omega_B^2 = \frac{1}{L_1 C_1} + \frac{4}{L_1 C_2} \tag{4}$$

$\omega_B = 2\pi f_B$ where $f_B$ is the highest frequency passed by the filter which is known as the "upper cutoff frequency."

$$Z_I^2 + 1/4\omega^2 L_1^2 \left(1 - \frac{\omega_A^2}{\omega^2}\right)\left(\frac{\omega_B^2}{\omega^2} - 1\right) \tag{5}$$

$Z_I$ is the image impedance.

$$Z_{I_{max}} = (Z_I)_{\omega = \sqrt{\omega_A \omega_B}} = \frac{L_1}{2}(\omega_B - \omega_A) \tag{6}$$

where $Z_{I_{max}}$ is the maximum value of the image impedance in the transmitted band and occurs, for the specific filter illustrated by Fig. 2, at substantially the mid-frequency of the transmitted band. The symbol "$Z_I$" is the conventional symbol employed for "image impedance" in filter design formulae. The subscript I employed as part of this symbol stands for "image" and is in no way related to the symbol I used independently to denote "moment of inertia."

From Equations 3, 4 and 6 the nominal values of the elements of the filter of Fig. 2 may be obtained.

$$L_1 = \frac{Z_{I_{max}}}{\pi(f_B - f_A)} \tag{7}$$

$$C_1 = \frac{f_B - f_A}{4\pi f_A^2 Z_{I_{max}}} \tag{8}$$

$$C_2 = \frac{1}{\pi Z_{I_{max}}(f_B + f_A)} \tag{9}$$

In general, as is explained in my above-mentioned book, electrical inductance is analogous to mass and electrical capacitance is analogous to compliance, respectively, of the elements of a corresponding mechanical wave filter. Compliance is defined as the inverse of the stiffness.

Figure 3:
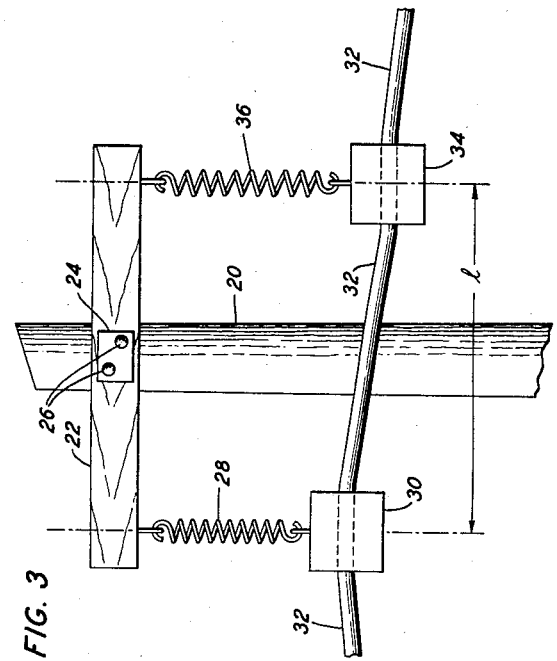
Fig. 3 is a diagrammatical illustration of one possible assembly of mechanical elements which can be arranged, proportioned and interconnected to constitute a mechanical band-pass wave filter for use as an interspan supporting arrangement in aerial cable systems in accordance with the principles of the invention.

In Fig. 3, a first specific form of mechanical band-pass wave filter adaptable to support an aerial cable in accordance with the principles of the invention is illustrated. This filter comprises the substantially identical steel springs 28 and 36, each having a stiffness $k$, the substantially identical weights 30 and 34, each having a mass M, and the length of the cable 32 between the weights 30 and 34. For the purpose of this analysis, the just-mentioned section of cable is treated as a flexible string under tension characterized by a particular stiffness, the weight of this section of cable being considered as contributing half its weight to each of the identical weights 30 and 34. As shown in Fig. 3, spring 36 is deflected or extended more than spring 28 which would correspond to an instant at which an upwardly directed force from the left span had decreased the extension of spring 28 and the tension of the cable section between weights 30 and 34 had not yet correspondingly raised weight 34. When at rest, i.e., in the position of static equilibrium, springs 28 and 36 would be extended equally.

The upper ends of the springs 28 and 36 are supported, with a predetermined spacing $l$ between them, by the fixed rigid member 22. Member 22 can appropriately be either of steel or of wood of suitable cross-sectional area, proportioned and shaped to afford a substantially fixed rigid support. It is bolted rigidly to pole 20 by means of bolts 26 and steel clamping plate 24.

Weights 30 and 34 are supported by the lower ends of springs 28 and 36, respectively, as shown.

The cable 32 is securely fastened by any appropriate clamping means to the weights 30 and 34, the length of the cable 32 between the weights being such that springs 28 and 36 are, when at rest, maintained in substantially vertical positions. The horizontal rigid member 22 should be substantially parallel to the cable 32 and in the same vertical plane therewith. The portion of cable 32 between weights 30 and 34 (also of the above mentioned predetermined length $l$) will, obviously, in the arrangement just described, be under the same tension $T$ as the cable spans to the left and right of these weights, respectively. As has been previously mentioned, the steel supporting strand of the cable is arranged to withstand substantially all tension developed in the cable.

To analyze the action of the mechanical band-pass wave filter of Fig. 3, described above, it will be assumed that the vibratory energy in the cable span to the left exerts at a given instant an upwardly directed force $F_1$ on the weight 30 and that as a result of this force, an instantaneous downwardly directed force of $F_2$ is exerted by the weight 34 on the cable span to the right of weight 34. The direction of $F_2$ will, as is well known to those skilled in the art, depend upon the location of the frequency of the vibration being transmitted within the transmitting band of the filter. In the vicinity of the upper portion of the transmitting band for an upwardly directed force $F_1$, $F_2$ will be downwardly directed while in the lower portion of the band, $F_2$ will also be upwardly directed. See article "Filters in Action" by C. E. Lane, mentioned above. It is further assumed that $y_1$ and $y_2$ are the respective vertical displacements of weights 30 and 34 from their respective static equilibrium positions.

Assuming further, a substantially sinusoidal steady state vertical oscillation of the end of the cable span to the left of weight 30 we may write $$v_1 = \dot{y}_1 = j\omega y_1 \text{ and } v_2 = \dot{y}_2 = j\omega y_2 \quad (10)$$

for the velocities of vertical movement of weights 30 and 34, respectively. (The dot above $y_1$ and $y_2$ signifies the first derivative with respect to time and two dots in Equations 11 and 12, below, signify the second derivative with respect to time.)

$$M\ddot{y}_1 = F_1 - ky_1 - \frac{T}{l}(y_1 - y_2) \quad (11)$$

$$M\ddot{y}_2 = -F_2 - ky_2 + \frac{T}{l}(y_1 - y_2) \quad (12)$$

which for steady-state oscillations of frequency $\omega$ may be written respectively as $$F_1 - j\omega M v_1 - \frac{kv_1}{j\omega} - \frac{T}{j\omega l}(v_1 - v_2) = 0 \quad (13)$$

$$-F_2 - j\omega M v_2 - \frac{kv_2}{j\omega} + \frac{T}{j\omega l}(v_1 - v_2) = 0 \quad (14)$$

Comparison of Equations 13 and 14 above with the mesh Equations 1 and 2 of the electrical wave filter illustrated in Fig. 2 demonstrates the analogy of the mechanical structural arrangement of Fig. 3 to the electrical structure of Fig. 2.

Comparing the mechanical filter of Fig. 3 with its analogous electrical filter of Fig. 2, the following correspondences are evident.

$1/k$ corresponds to $2C_1$
$M$ corresponds to $\frac{1}{2}L_1$
$\frac{l}{T}$ corresponds to $C_2$
$v_1$ corresponds to $i_1$
$v_2$ corresponds to $i_2$
$F_1$ corresponds to $E_1$
$F_2$ corresponds to $E_2$ The element values $L_1$, $C_1$, $C_2$, or their respective mechanical analogues determine the cut-off frequencies $\omega_A$, $\omega_B$, and the characteristic impedance at any frequency $\omega$, $Z_I(\omega)$ is determined in accordance with the relations $$\omega_A^2 = \frac{1}{L_1 C_1} = \frac{k}{M} \quad (15)$$

$$\omega_B^2 = \frac{1}{L_1}\left(\frac{1}{C_1} + \frac{4}{C_2}\right) = \frac{k}{M} + \frac{2T}{Ml} \quad (16)$$

$$Z_I^2 = \frac{\omega^2 L_1^2}{4}\left(1 - \frac{\omega_A^2}{\omega^2}\right)\left(\frac{\omega_B^2}{\omega^2} - 1\right) = \omega^2 M^2 \left(1 - \frac{f_A^2}{f^2}\right)\left(\frac{f_B^2}{f^2} - 1\right) \quad (17)$$

The maximum value of $Z_I$ occurs at $f^2 = f_A f_B$ and is $$Z_{I_{\max}} = 2\pi M(f_B - f_A) \quad (18)$$

The static deflection $\delta_M$ of the spring due to the weight of the mass $M$ satisfies the relation $$Mg = k\delta_M$$

where $g$ is the symbol representing gravitational acceleration whence $$\delta_M = \frac{Mg}{k} = \frac{g}{\omega_A^2} \quad (19)$$

If $f_A$ is to be less than say 0.8 cycle per second, then $\omega_A^2 < 25.3$ sec.$^{-2}$ and $$\delta_M > \frac{32.2}{25.3} = 1.27 \text{ feet}$$

In addition to the weight of the mass $M$, the spring must support the weight of a half span of cable which is approximately 85 pounds. The deflection due to the static weight of the cable is $$\delta_c = \frac{W}{2k}$$

whence $$k = \frac{W}{2\delta_c}$$

where $W$ = weight per span.
From Equation 15, $$M = k/\omega_A^2 = W/2\delta_c \omega_A^2 \quad (20)$$

From Equations 15 and 16, 20, $$\omega_B^2 = \omega_A^2\left(1 + \frac{4T\delta_c}{Wl}\right)$$

whence $$\frac{\delta_c}{l} = \frac{W}{4T}\left(\frac{f_B^2}{f_A^2} - 1\right) \quad (21)$$

From Equations 18 and 20, $$Z_{I_{\max}} = \frac{W}{4\pi f_A^2 \delta_c}(f_B - f_A) \quad (22)$$

whence $$\delta_c = \frac{W}{4\pi f_A Z_{I_{\max}}}\left(\frac{f_B}{f_A} - 1\right) \quad (23)$$

Suppose $f_B = 3$ cycles per second and $f_A = 0.8$ cycle per second then $f_B/f_A = 3.75$. Assuming that a 2 to 1 impedance mismatch is permissible at midband, then $Z_{I_{\max}} = 2 \times 5.25 = 10.5$ slugs/second; $W = 171$ pounds;

$$\delta_c = \frac{171 \times 2.75}{4\pi \times .8 \times 10.5} = 4.46 \text{ feet}; \frac{\delta_c}{l} = \frac{W}{4T}\left(\frac{f_B^2}{f_A^2} - 1\right)$$

$$= \frac{171}{4 \times 1550} \times 13.1 = 0.361; l = \frac{\delta_c}{0.361} = \frac{4.46}{0.361}$$

$$= 12.3 \text{ feet}; k = \frac{W}{2\delta_c} = \frac{171}{2 \times 4.46} = 19.2 \text{ lb./ft.; and } M$$

$$= \frac{k}{\omega_A^2} = \frac{19.2}{25.3} = 0.758 \text{ slug, or } 24.4 \text{ lbs.}$$

To lower $\delta_c$ to 1.5 feet with these same cutoffs would require $$Z_{I_{max}} = 10.5 \times \frac{4.46}{1.5} = 31.2 \text{ slugs/sec.}$$

giving a 31.2/5.25 to 1, i.e., a 6 to 1 impedance mismatch at midband. This would result in an insertion loss of approximately 15 db at midband, or reflection of over 90 percent of the incident energy and would obviously not be satisfactory.

The large static deflection required to obtain a wide band with reasonably close impedance matching makes this arrangement impractical for use with the "typical" cable described above. However for a considerably lighter cable the filter of Fig. 3 would prove feasible.

For the relatively heavy cable described in detail above, a particularly simple and economical band-pass, mechanical, wave filter, cable supporting means operating in accordance with the principles of the present invention, is shown in Figs. 4 and 5 of the accompanying drawings. Fig. 5 is an end view of the major elements comprising the filter structure of Fig. 4, and shows the angular relation of the end arms 62, 64, of the structure more clearly.

In Fig. 4 the pole 50 has firmly attached thereto, by a bolt 54 and nut 55, a horizontal rigid supporting member 52, which extends in a direction parallel to the cable 70 and generally in the same vertical plane with the cable 70. Member 52 carries bearings 56 and 58 which support the steel bar 60 at positions near its respective ends as shown. The bearings 56, 58 permit free rotation of bar 60 about its longitudinal axis but prevent other movement of bar 60.

At each end of bar 60, substantially identical rigid arms 62 and 64 are firmly attached to bar 60 as for example by keys 61 and 63, respectively, shown in Fig. 5, and at the respective angles indicated in Fig. 5 for the arms 62 and 64.

The cable 70 is held firmly by stud-bolts 66, nuts 78 and clamps 73 and 71 on the ends of arms 64 and 62, respectively, details of the clamping arrangements being also shown in Fig. 5. A protective member 66 on the end of each of the arms 62 and 64 and a ring-shaped protective member 68 around the cable at each point of clamping are preferably provided to avoid damaging the cable sheath. Rubberized fabrics suitable for use as protective members are well known to those skilled in the art. Between clamps 73 and 71 a loop of the cable 70 is left under substantially no tension and, except for its contribution to the effective weights of the arms 64 and 62, respectively, the loop plays no part in the filtering action of the over-all structure of Figs. 4 and 5.

The mechanical band-pass wave filter cable support of Fig. 4 is designed so that arms 62 and 64 are substantially rigid, each having (with the contribution of substantially half the weight of the cable loop between clamps 71 and 73) an inertia I. The tension of the respective cable span supported by each of the arms 62, 64 can be balanced by connecting the end of each of these arms to the center point of rod 60 or to a closely adjacent point on supporting member 52 by a short flexible steel cable, without sensibly affecting the over-all operation of the mechanical filter structure. Such short cables are not shown on Fig. 4 since they do not enter into the filter operation.

The bar 60, assuming an instant of no cable vibration (i.e., the static equilibrium position), is under a constant torque produced by the weights of the cable spans to the left of arm 64 and to the right of arm 62 and the effective weights of the arms themselves. The bar 60 thus affords a coupling or mutual torsional stiffness between the arms 64 and 62. A "stiffness" effectively in series with each of the arms 64 and 62 is afforded by the tendency of gravity to restore the structure to its static equilibrium position whenever vibrational forces cause it to assume some other position. The underlying principle involved is of course that which permits a time piece or clock to employ a balance wheel and restoring spring in place of a pendulum and the restoring force of gravity, or vice versa.

As is illustrated more clearly in Fig. 5, the positions of arms 62 and 64, for the static equilibrium position, i.e., during intervals of no cable vibration, are shown and are such that the points of cable support at the ends of these arms are each effectively a horizontal distance $a$ from the vertical center line through the cross section of bar 60 in the respective planes of the arms, and a distance $b$ below the horizontal center line through the cross section of bar 60 as shown. The distances $a$ and $b$ will be referred to as the horizontal and vertical projections, respectively, of each of the arms 62 and 64.

Instantaneous displacements of arms 64 and 62 from the static equilibrium position are indicated by broken lines 77 and 79 at angles $\theta_1$ and $\theta_2$, respectively, in Fig. 5. The resulting vertical displacements of the ends of arms 64 and 62 are designated as $y_1$ and $y_2$, respectively, for purposes of the analysis given hereinunder.

Designating the ends of arms 64 and 62 by the numbers 1 and 2, respectively, the vertical vibrational forces which the cable spans exert on the ends 1 and 2 are assumed to act purely in vertical planes parallel to each other and to the fixed longitudinal (horizontal) axis of bar 60, i.e., the axis of rotation of bar 60. Since the vertical vibration of the cable has been found to be mainly responsible for damage to the cable, the above assumption is deemed appropriate and therefore only the vertical components are considered in computing the moments about the fixed horizontal axis of bar 60.

The symbols to be employed in the analysis of the structure of Figs. 4 and 5 are as follows:

$W$ = weight per span of cable and supporting strand
$F_{jt}$ = vertical (upward) component of force exerted on end $j$ by cable and strand, where $j$ is taken successively to refer to ends 1 and 2 respectively.

$$F_{jt} = F_j - \frac{W}{2}$$

where $F_j$ = alternating part of $F_{jt}$
$\theta_j$ = angular displacement of end $j$ from its initial static load equilibrium position
$y_j$ = vertical displacement of end $j$ from its initial static load equilibrium position
$y_2 = -b(1-\cos \theta_2) - a \sin \theta_2$
$y_2 = -b(1-\cos\ _2) - a \sin \theta_2$
$T_0$ = initial static coupling torque between ends 1 and 2
$a$ = horizontal projection of each arm
$T_0 = Wa/2$
$T_{jt}$ = total torque applied by cable at end $j$
$b$ = vertical projection of each arm
$T_{1t} = F_{1t}(a \cos \theta_1 + b \sin \theta_1)$
$T_{2t} = -F_{2t}(a \cos \theta_2 - b \sin \theta_2)$
$k$ = torque coupling between ends 1 and 2 per unit angular rotation between ends 1 and 2
$I$ = moment of inertia of each arm $$T_1 = T_{1t} + T_0 = (\text{variable part of } T_{1t}) = T_{1t} + \frac{Wa}{2}$$

$$T_2 = T_{2t} - T_0 = (\text{variable part of } T_{2t}) = T_{2t} - \frac{Wa}{2}$$

The equations of motion for the mount are $$T_{1t} + T_0 + k(\theta_2 - \theta_1) = I\ddot{\theta} \quad (24)$$

$$T_{2t} - T_0 - k(\theta_2 - \theta_1) = I\ddot{\theta}_2 \quad (25)$$

(The double dots above $\theta$ indicate "the second derivative with respect to time.")

Now $$T_1 = T_{1t} + T_0 = \left(F_1 - \frac{W}{2}\right)(a\cos\theta_1 + b\sin\theta_1) + \frac{Wa}{2}$$

$$= F_1(a\cos\theta_1 + b\sin\theta_1) - \frac{Wb}{2}\sin\theta_1 + \frac{Wa}{2}(1 - \cos\theta_1) \quad (26)$$

and $$T_2 = T_{2t} - T_0 = -\left(F_2 - \frac{W}{2}\right)(a\cos\theta_2 - b\sin\theta_2) - \frac{Wa}{2}$$

$$= -F_2(a\cos\theta_2 - b\sin\theta_2) - \frac{Wb}{2}\sin\theta_2 - \frac{Wa}{2}(1 - \cos\theta_2) \quad (27)$$

If we express the functions of $\theta_j$ as power series, and neglect powers of $\theta_j$ higher than the first, and also neglect $b\theta_j$ in comparison with $a$, then the expressions for $T_1$ and $T_2$ simplify to $$T_1 = F_1 a - \frac{Wb}{2}\theta_1 \quad (28)$$

$$T_2 = -F_2 a - \frac{Wb}{2}\theta_2 \quad (29)$$

With this approximation, the equations of motion become $$F_1 a - \frac{Wb}{2}\theta_1 + k(\theta_2 - \theta_1) = I\ddot{\theta}_1 \quad (30)$$

$$-F_2 a - \frac{Wb}{2}\theta_2 - k(\theta_2 - \theta_1) = I\ddot{\theta}_2 \quad (31)$$

These equations may be put in the form of the usual steady-state mesh equations for the circuit of Fig. 2 by writing $$\theta_j = A_j e^{i\omega t}, \text{ where } i = \sqrt{-1} \quad (32)$$

Then $$\theta_j = \frac{\dot{\theta}_j}{i\omega} \text{ and } \ddot{\theta}_j = i\omega\dot{\theta}_j$$

These substitutions lead to $$F_1 a - \frac{Wb}{2i\omega}\dot{\theta}_1 + \frac{k}{i\omega}(\dot{\theta}_2 - \dot{\theta}_1) = i\omega I\dot{\theta}_1 \quad (33)$$

$$-F_2 a - \frac{Wb}{2i\omega}\dot{\theta}_2 - \frac{k}{i\omega}(\dot{\theta}_2 - \dot{\theta}_1) = i\omega I\dot{\theta}_2 \quad (34)$$

By comparison with the mesh equations for the circuit of Fig. 2, the correspondences between the mechanical quantities of the device of Fig. 4 and the electrical quantities of the structure of Fig. 2 are as follows:

$\frac{1}{2}L_1$ corresponds to $I$
$2C_1$ corresponds to $2/Wb$
$C_2$ corresponds to $1/k$
$E_1$ corresponds to $F_1 a$
$E_2$ corresponds to $F_2 a$
$i_1$ corresponds to $\dot{\theta}_1$
$i_2$ corresponds to $\dot{\theta}_2$ By making use of these correspondences in the relations listed for the structure of Fig. 2, the following relations are obtained.

$$\omega_A^2 = \frac{Wb}{2I} \quad (35)$$

$$\omega_B^2 = \frac{Wb}{2I} + \frac{2k}{I} \quad (36)$$

$$Z_I^2 = \omega^2 I^2 \left(1 - \frac{f_A^2}{f^2}\right)\left(\frac{f_B^2}{f^2} - 1\right) \quad (37)$$

$$Z_{I\max} = 2\pi I(f_B - f_A) \quad (38)$$

When the structure is properly terminated to prevent reflections, $$Z_I = \frac{F_1 a}{\dot{\theta}_1} = +\frac{F_2 a}{\dot{\theta}_2} \quad (39)$$

Since $\dot{\theta}_1 \approx \dot{y}_1/a$, and $\dot{\theta}_2 \approx \dot{y}_2/a$ $$Z_I = a^2 \frac{F_1}{\dot{y}_1} = -a^2 \frac{F_2}{\dot{y}_2} \quad (40)$$

The significant advantage of this arrangement over the preceding one (Fig. 3) is that the stiffness corresponding to $1/2C_1$ is not required to support the strand, but only to provide a stable equilibrium position for the structure. The degree of stability is determined by the value of $b$. Equation 35 shows that $b$ is proportional to the square of the lower cutoff, $f_A$. Hence, this cutoff can be lowered to any desired value, but only by sacrificing static stability for the structure. There is a practical lower limit for $b$, and hence for $f_A$.

The stiffness coupling, $k$, is not a limiting parameter, since almost any desired value of $k$ can be built into the structure by selection of appropriate values for the length, diameter and resilience of the bar 60. In a typical case of a filter for the typical cable described above bar 60 was of mild steel having a diameter of 0.86 inch and a length of 5 feet.

This arrangement has the disadvantage that the cable spans exert a torque (applied at the ends of arms 62, 64) about a vertical axis. This torque can, however, normally be resisted adequately by the supporting pole. For heavy cables a more elaborate "tower" of steel or the like may be required to adequately resist this vertical torque, or in some instances two like cables with their respective supports can contribute mutually opposed torques to compensate for each other.

Let us investigate the possibilities of this filter by again assuming a 2 to 1 impedance mismatch at midband with cutoffs at 0.8 cycle per second and 3 cycles per second. The matching impedance for this filter is obtained from Equation 4 by setting $F_1/y_1 = 5.25$ slugs/sec. Thus, for a 2 to 1 mismatch at midband, $$Z_{I\max} = 10.5 a^2 \frac{\text{slug ft.}^2}{\text{second}}$$

Suppose $a = 2$ feet. Then $Z_{I\max} = 42$ slug ft.$^2$/sec., and from Equation 38, the required moment of inertia is $$I = \frac{Z_{I\max}}{2\pi(f_B - f_A)} = \frac{42}{6.28 \times 2.2} = 3.04 \text{ slug ft.}^2$$

The corresponding value of $b$ is 0.9 foot. The moment of inertia can be kept considerably lower than 3 slug ft.$^2$, resulting either in a wider pass band, or in a better impedance match for the same width of pass band.

For example, suppose that $f_A = 0.6$ cycle per second, $I = 1$ slug ft.$^2$, and $Z_{I\max} = 42$ slug ft.$^2$/sec. Then, from Equation 38, $(f_B - f_A) = 42/6.28 = 6.7$ cycles per second. Thus, $f_B$ could be raised to 7.3 cycles per second. The corresponding value of $b$ would be about 2 inches. In this case, only 57 foot pounds of work could produce a 180 degree rotation of the structure. In some situations a larger value of $b$ is therefore desirable. A larger value can readily be obtained either by raising $I$, thus lowering $f_B$, or by raising $f_A$.

Before ending this discussion, it will be instructive to consider some limiting cases of this filter. With $b = 0$, the (statically neutral) structure is a low pass filter with $\omega_B^2 = 2k/I$. With $b = 0$, $k = \infty$, and vanishingly small $I$, the structure would be a rigid, inertia-less lever, with perfect transmission (like a direct connection) for all frequencies. If the structure was perfectly rigid ($k = \infty$) but with stability and inertia, there would be perfect transmission only at the frequency for which $\omega^2 = Wb/2I$. Since stability and inertia are necessary, the advantage of building compliance into the structure and designing it as a band-pass filter is apparent since nearly perfect transmission and satisfactory impedance relations can be obtained over a wide band of frequencies. This would be impossible with a perfectly rigid structure.

In Figs. 6 and 7 the use of one form of resistive termination for a mechanical band-pass cable supporting wave filter of the invention is illustrated. For convenience, the filter shown is that described above in detail in connection with Figs. 4 and 5, corresponding designation numbers being applied in Figs. 6 and 7 to like features of the two arrangements.

In Fig. 6 the cable 70 is clamped to the end of arm 64 by clamp 73 and bolts 78 as described above, the cable extending to the left of arm 64 as a span in the order of 300 feet long to a pole and supporting arrangement such as is illustrated in Figs. 4 and 5, for example. To the right of arm 64 of Fig. 6 the cable is, for example, led down the pole 50 to a terminal station, a sufficient loop being left between arm 64 and the uppermost cable to pole fastener 102 that free normal movement of arm 64 is not impeded.

In Fig. 6 the end of arm 62 of the mechanical filter cable supporting means is connected by a pivot joint 82 and rod 80 to the piston 86, shown in Fig. 7, of dash-pot 84. Dash-pot 84 is supported on trunnions 88 in the U-shaped bracket 92. Bracket 92 is supported on arm 94, one end of which arm is fastened to pole 50 by lag-screw 100. The other end of arm 94 is supported by a steel brace 96, a bolt 99 serving to both hold the bracket 92 on the arm 94 and to fasten the upper end of brace 96 to arm 94, as shown. Lag-screw 98 secures the lower end of brace 96 to the pole 50.

As is shown more clearly in the partial end view of Fig. 7, the piston 86 of dash-pot 84 is provided with a number of holes and the dash-pot 84 is filled with a viscous fluid 90 so that motion of piston 86 requires that appreciable energy be expended in forcing the piston to move through the fluid. As described, the dash-pot arrangement constitutes a mechanical, resistive, or energy dissipative, termination for the filter comprising arms 64, 62 and bar 60. The termination is proportioned to substantially match the characteristic mechanical impedance of the filter over its pass band of mechanical vibrational frequencies and thus will absorb with substantially no reflection all vibratory energy transmitted through the filter from cable 70 to arm 62. Obviously such a resistive termination could also be applied to any other suitable form of mechanical wave filter cable support. Alternatively, a mechanism of the well known "prony-brake" type could be employed as a resistive termination for any of the mechanical wave filter cable supports of the invention.

In Figs. 8 and 9, top and side views, respectively, of a modification of the mechanical wave filter cable supporting arrangement of Figs. 4 and 5 are shown. The arrangement illustrated by Figs. 8 and 9 is designed to avoid the torque about a vertical axis involved in the arrangement of Figs. 4 and 5, while retaining substantially all of the advantages of the latter arrangement.

The arrangement illustrated in Figs. 8 and 9 has the bar 60 supported for rotary motion about its longitudinal axis by bearings 56 and 58 which in turn are mounted on the rigid arm 52 supported by the pole 50 as for the arrangement of Figs. 4 and 5.

The arms 164 and 162 extend in both directions from bar 60 and are keyed thereto by keys 61 as shown. Arms 164 and 162 are counterweighted by weights 170 which can be moved along their respective arms to compensate for the weight of the cable span on the opposite end of the arm in each instance. Set screws 172 are tightened to hold weights 170 in position after proper adjustments have been made. As shown in the view of Fig. 8, the cable 70 passes directly from the lower or front end of arm 164 to the corresponding end of arm 162 and thence to the next successive span of cable. The straight line arrangement of the cable from span to span thus achieved enables the steel strand of the section of cable between arms 164 and 162 to assume the tension of the spans and thus further relieve the filter arms of a stress which may become of troublesome magnitude for the heavier telephone cables. Features of Figs. 8 and 9 bearing the same designation numbers respectively as features of Figs. 4 and 5 are as described in connection with the last mentioned figures. Obviously, it can readily be demonstrated by those skilled in the art that the structure of Figs. 8 and 9 is substantially equivalent to that of Figs. 4 and 5 and is a mechanical band-pass filter structure analogous to the electrical wave filter represented by the schematic diagram of Fig. 2.

Numerous other and further arrangements involving the principles of the invention and within the spirit and scope thereof can readily be devised by those skilled in the art.

What is claimed is:

1. Mechanical filtering means for supporting the adjacent ends of a successive pair of cable spans of an aerial cable system, said filtering means comprising an elongated bar of resilient material, rigidly supported bearing means supporting said bar in a horizontal position for free rotation about its longitudinal axis, a first rigid arm attached rigidly to a first end of said bar at an angle of substantially 90 degrees with respect to the longitudinal axis of said bar, a second rigid arm attached rigidly to the other end of said bar at an angle of substantially 90 degrees with respect to the longitudinal axis of said bar, the plane including the longitudinal axes of said first arm and said bar being at an angle differing by a predetermined small amount from 180 degrees with respect to the plane including the longitudinal axes of said second arm and said bar, means at the free end of said first arm for securely fastening the end of one of said pair of cable spans, means at the free end of said second arm for securely fastening the end of the other of said pair of cable spans, the moments of inertia about the longitudinal bar axis of said first and second arms, the compliance of said bar and the gravitational restoring forces on said arms constituting a mechanical band-pass filter which freely passes a predetermined band of vibrational frequencies including several low harmonics of the fundamental frequency of transverse vibration of said cable spans, the characteristic mechanical impedance of said filter over said band of frequencies substantially matching a predetermined characteristic mechanical impedance said last mentioned impedance being that of the cable spans with which said filter is to be employed.

2. Cable interspan supporting means comprising a resilient rod, fixed bearing means supporting the rod horizontally for rotation about its longitudinal axis, a pair of rigid arms attached to opposite ends of the rod, respectively, the arms being substantially at right angles to the rod and at an angle of approximately 150 degrees with respect to each other, and cable holding means on the free end of each arm, the masses of the arms and the resilience of the rod being proportioned to constitute a mechanical wave filter passing a predetermined frequency band of transverse vibrational energy, the filter having a mechanical impedance substantially matching the mechanical impedance of the cable for said energy.

References Cited in the file of this patent

UNITED STATES PATENTS

| | | |
|---|---|---|
| 1,666,681 | Burgess | Apr. 17, 1928 |
| 2,727,085 | Tornquist et al. | Dec. 13, 1955 |
| 2,790,843 | Gordon | Apr. 30, 1957 |

FOREIGN PATENTS

| | | |
|---|---|---|
| 554,712 | Germany | July 14, 1932 |